(12) United States Patent  
Mangia et al.

(10) Patent No.: US 9,126,458 B2  
(45) Date of Patent: Sep. 8, 2015

(54) PNEUMATIC TIRE

(75) Inventors: Massimo Mangia, Lombardia (IT); Toshiki Nagai, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 155 days.

(21) Appl. No.: 13/880,147

(22) PCT Filed: Oct. 19, 2011

(86) PCT No.: PCT/JP2011/074064  
§ 371 (c)(1),  
(2), (4) Date: May 16, 2013

(87) PCT Pub. No.: WO2012/053558  
PCT Pub. Date: Apr. 26, 2012

(65) Prior Publication Data  
US 2013/0233461 A1    Sep. 12, 2013

(30) Foreign Application Priority Data

Oct. 19, 2010   (JP) ................................. 2010-234658  
Jun. 28, 2011   (JP) ................................. 2011-143088

(51) Int. Cl.  
*B60C 15/00*    (2006.01)  
*B60C 15/06*    (2006.01)

(52) U.S. Cl.  
CPC ......... *B60C 15/0603* (2013.04); *B60C 15/0054* (2013.04); *B60C 15/0607* (2013.04); *B60C 15/06* (2013.01); *B60C 2015/061* (2013.04); *B60C 2015/0617* (2013.04); *B60C 2015/0621* (2013.04); *Y10T 152/10819* (2015.01)

(58) Field of Classification Search  
CPC .... B60C 15/00; B60C 15/06; B60C 15/0603; B60C 15/0607  
See application file for complete search history.

(56) References Cited

U.S. PATENT DOCUMENTS

| | | | |
|---|---|---|---|
| 5,879,485 A | 3/1999 | Sakamoto et al. | |
| 7,640,958 B2 * | 1/2010 | Kouno | ........................... 152/539 |
| 8,839,833 B2 * | 9/2014 | Grisin et al. | ................... 152/541 |
| 2006/0207709 A1 | 9/2006 | Tanaka et al. | |

FOREIGN PATENT DOCUMENTS

| | | | |
|---|---|---|---|
| CN | 1805860 A | | 7/2006 |
| EP | 0638445 A1 | | 2/1995 |
| EP | 1568513 | * | 8/2005 |
| JP | 7-101203 A | | 4/1995 |
| JP | 8-207516 A | | 8/1996 |

(Continued)

OTHER PUBLICATIONS

Machine translation of WO 2007/042119, 2007.*

(Continued)

*Primary Examiner* — Justin Fischer  
(74) *Attorney, Agent, or Firm* — Sughrue Mion, PLLC (57) ABSTRACT

In the present invention, a carcass (120) of a pneumatic tire (1A) comprises a toroidal-shaped carcass main body (121) and a carcass folded part (122) folded at a bead core (111). A bead filler (131) is disposed outward of the bead core (111) in the tire radial direction. A rubber sheet (132) is disposed outward of the bead filler (131) in the tire radial direction. A space (DA) is formed between the tire radial direction outer side end (131a) of the bead filler (131) and the tire radial direction inner side end (132b) of the rubber sheet (132).

7 Claims, 4 Drawing Sheets

(56) References Cited

FOREIGN PATENT DOCUMENTS

| | | | |
|---|---|---|---|
| JP | 2004-306742 A | | 11/2004 |
| JP | 2005-7961 A | | 1/2005 |
| JP | 2005007961 | * | 1/2005 |
| JP | 2006-188178 A | | 7/2006 |
| JP | 2006-199223 A | | 8/2006 |
| JP | 2009-113741 A | | 5/2009 |
| KR | 2001066265 | * | 7/2001 |
| WO | WO 2007/042119 | * | 4/2007 |
| WO | WO 2010/149570 | * | 12/2010 |

OTHER PUBLICATIONS

Literature Submission, dated May 27, 2014, issued in counterpart Japanese Patent Application No. 2012-539752.

International Search Report for PCT/JP2011/074064 dated Jan. 24, 2012.

Communication dated Dec. 17, 2014, issued by the State Intellectual Property Office of the People's Republic of China in corresponding Chinese Application No. 201180056810.3.

* cited by examiner

PNEUMATIC TIRE

CROSS REFERENCE TO RELATED APPLICATIONS

This application is a National Stage of International Application No. PCT/JP2011/074064 filed Oct. 19, 2011, claiming priority based on Japanese Patent Application Nos. 2010-234658 filed Oct. 19, 2010 and 2011-143088 filed Jun. 28, 2011, the contents of all of which are incorporated herein by reference in their entirety.

TECHNICAL FIELD

The present invention relates to a pneumatic tire comprising a carcass as a skeleton structure, which has a carcass body toroidally extending between a pair of bead cores, and a carcass turn-up portion that the carcass body is wound around the bead core from inside toward outside of the tire and extended outside in the radial direction of the tire.

BACKGROUND ART

In recent years, a reduction in fuel consumption of a vehicle is required from the viewpoint of environmental protection. Along with this, a reduction in rolling resistance is required for a pneumatic tire.

A hysteresis loss that is a main cause of rolling resistance of a pneumatic tire increases in a tread portion to contact a road surface and adjacent portions. There is a known method of reducing a hysteresis loss caused by deformation of a tread portion, which makes a bead portion easy to deform by decreasing the stiffness in a tire radial direction (a stiffness in a radial direction) of a bead portion located in a lower part of a sidewall, disperses the deformation of a tread portion to a bead portion, and decreases a hysteresis loss caused by the deformation of a tread portion.

On the other hand, the stiffness of a part ranging from a bead portion to a side wall portion of a pneumatic tire contributes to a vehicle stability to rolling and pitch, and if the stiffness in a radial direction of a part ranging from a bead portion to a side wall portion is set extremely low, a driving stability may decrease.

To solve the above problem, the applicants have proposed a pneumatic tire that reduces a rolling resistance without extremely decreasing stiffness in a radial direction (see Patent Literature 1).

In a pneumatic tire of the Patent Literature 1, a stiffener is disposed more outside than a bead core in a tire radial direction, a most thickness portion of a rubber chafer is disposed outside a carcass turn-up portion in a tire width direction and in proximity of an outer end of a stiffener in a tire radial direction, a sectional area of a stiffener with respect to a sectional area of a rubber chafer is 0.5 or lower, and a rubber with JIS A hardness of 80 degrees or higher is disposed in an area between a carcass crown portion and a bead core.

CITATION LIST

Patent Literature

Patent Literature 1: Japanese Patent Application Publication No. 8-207516

SUMMARY OF INVENTION

In recent years, the demand for reduction of the rolling resistance has increased. Thus, the above method of reducing the rolling resistance depending on decreasing the stiffness of the part ranging from a bead portion to a sidewall portion may impair the driving stability and is limited. In other words, there is still room for improvement to realize both decreased rolling resistance and driving stability at the same time.

Accordingly, it is an object of the present invention to provide a pneumatic tire which realizes both decreased rolling resistance and driving stability at a high level.

The applicants of the present invention have extensively studied and concluded that, even in the part ranging from a bead portion to a sidewall portion that is known as a part contributing to reduce the rolling resistance of a pneumatic tire, a portion contributing to the effect of increasing the lateral stiffness of a pneumatic tire and a portion contributing to reduction of the rolling resistance are different.

Based on the above conclusion, the applicants have found that both reduced rolling resistance and driving stability can be realized at a high level by configuring each part of a pneumatic tire as described below. That is, the present invention has the following features.

A first feature of the present invention is summarized as a pneumatic tire which is provided with a carcass comprising a carcass body toroidally extending between a pair of bead cores, and a carcass turn-up portion that the carcass body is wound around the bead core from inside toward outside of the tire and extended outside in a tire radial direction of the tire, and is installed in a rim, comprising: a first filling material disposed between the carcass body and the carcass turn-up portion and more outside than the bead core in the tire radial direction; and a second filling material disposed more outside than the first filling material in the tire radial direction, wherein a predetermined space is provided in the tire radial direction between an outside end of the first filling material in the tire radial direction and an inside end of the second filling material in the tire radial direction.

In the pneumatic tire according to the present invention, the first filling material is disposed more outside than the bead core in the tire radial direction, the second filling material is disposed more outside than the first filling material in the tire radial direction, and the space is provided between the outside end of the first filling material in the tire radial direction and the inside end of the second filling material in the tire radial direction. The space is filled with a rubber with stiffness lower than a stiffness of the first and second filling materials, such as a rubber coating a carcass.

Therefore, the stiffness of the bead portion of the pneumatic tire is lower than the stiffness of a bead portion of a conventional pneumatic tire that the space is filled with a filling material of higher stiffness. Thus, the pneumatic tire is easy to locally deform in the space.

Further, in the pneumatic tire, the second filling material is located more outside than the space in the tire radial direction. Therefore, the pneumatic tire has a configuration that the second filling material is located more outside than the space in the tire radial direction to prevent a sidewall portion from the influence of decreasing the stiffness in the space, it is possible to prevent deterioration of the driving stability due to setting a stiffness low in the radial direction of a part ranging from a bead portion to a sidewall portion.

A second feature of the present invention according to the above feature is summarized as that when a length from an innermost position of the carcass body in the tire radial direction to an outermost position of the carcass body in the tire radial direction is expressed as CSH, the outside end of the first filling material in the tire radial direction is formed to be interposed between a position at a length of 0.05 CSH more outside than a flange line in the tire radial direction and a position at a length of 0.10 CSH more inside than the flange line in the tire radial direction, the flange line being a line along the tire axial direction passing through an outside end of a rim flange portion of the rim in the tire radial direction, an outside end of the second filling material in the tire radial direction is formed at a position at a length of 0.70 CSH more outside than a carcass baseline in the tire radial direction or at an inside of said position, the carcass baseline being a line along the tire axial direction passing through an inside end of the carcass body in the tire radial direction, the inside end of the second filling material in the tire radial direction is formed to be disposed at a position aligned with the flange line, or between a position at a length of 0.15 CSH more outside than the flange line in the tire radial direction and the flange line, and a length L of the second filling material along the carcass body satisfies the relation 0.15 CSH≤L≤0.55 CSH.

A third feature of the present invention according to the above feature is summarized as that when an outermost point of the rim guard in the tire width direction is assumed to be a rim guard top, and a length from an innermost position of the carcass body in the tire radial direction to an outermost position of the carcass body in the tire radial direction is expressed as CSH, the outside end of the first filling material in the tire radial direction is formed to be interposed between a position at a length of 0.15 CSH more inside than a top line in the tire radial direction and a position at a length of 0.05 CSH more outside than the top line in the tire radial direction, the top line being a line along the tire axial line passing through the rim guard top, the inside end of the second filling material in the tire radial direction is formed to be interposed between a position at a length of 0.05 CSH more outside than the top line in the tire radial direction and a position at a length of 0.2 CSH more outside than the top line in the tire radial direction, an outside end of the second filling material in the tire radial direction is formed at a position at a length of 0.70 CSH more outside than a carcass baseline in the tire radial direction or at an inside of said position, the carcass baseline being a line along the tire axial direction passing through an inside end of the carcass body in the tire radial direction, and a length L of the second filling material along the carcass body satisfies the relation 0.15 CSH≤L≤0.4 CSH.

The pneumatic tire according to the present invention is further provided with a rim guard projecting toward outside in the tire width direction. A rim guard means a protrusion projecting toward outside in the tire width direction at a position on the outer surface of a sidewall portion right above a rim flange. The protrusion is preferably formed by a concave curve toward inside in the tire width direction.

The rim guard may be formed to have a triangular or trapezoidal protrusion, or two or more protrusions. In such a rim guard of various forms, a rim guard top means an outermost point in the tire width direction in an area provided with a rim guard in a no-load condition. In a rim guard having two or more outermost points in the tire width direction, such as a trapezoidal rim guard, the outermost point in the width direction located most inside in the tire radial direction is defined as a rim guard top.

In the pneumatic tire having such a rim guard, the outside end of the first filling material in the tire radial direction is interposed between the position of 0.15 CSH in length more inside in the tire radial direction than the top line passing through the rim guard top along the tire axial direction, and the position of 0.05 CSH in length more outside than the top line in the tire radial direction. An end of the second filling material inside in the tire radial direction is interposed between the position of 0.05 CSH in length more outside than the top line in the tire radial direction, and the position of 0.2 CSH in length more outside than the top line in the tire radial direction.

In such a pneumatic tire, the above-mentioned space can be formed in an area close to the top line passing through the rim guard top along the tire axial direction, and the stiffness of the area close to the top line can be locally decreased. Further, such a pneumatic tire is easy to locally deform in the space, and compared with deformation at several points in a range from a bead portion to a sidewall portion, the deformed volume of the rubber can be suppressed. Therefore, in the pneumatic tire, the hysteresis loss can be suppressed, and the rolling resistance can be decreased.

A fourth feature of the present invention according to the above feature is summarized as that a space in the tire radial direction between the outside end of the first filling material in the tire radial direction and the inside end of the second filling material in the tire radial direction is over 3 mm and below 15 mm.

A fifth feature of the present invention according to the above feature is summarized as that a thickness of the second filling material in the normal direction of the carcass body is over 0.5 mm and below 5.0 mm.

A sixth feature of the present invention according to the above feature is summarized as that an elastic modulus of the second filling material is over 20% and below 50% of an elastic modulus of the first filling material.

A seventh feature of the present invention according to the above feature is summarized as that a loss tangent of the second filling material is over 10% and below 30% of a loss tangent of the first filling material.

An eighth feature of the present invention according to the above feature is summarized as that an elastic modulus of a material disposed in the predetermined space provided between the first filling material and the second filling material is lower than or equal to an elastic modulus of the second filling material.

A ninth feature of the present invention according to the above feature is summarized as that an elastic modulus of a material disposed in the predetermined space provided between the first filling material and the second filling material is over 3% and below 20% of an elastic modulus of the first filling material.

A tenth feature of the present invention according to the above feature is summarized as that a loss tangent of a material disposed in the predetermined space provided between the first filling material and the second filling material is over 10% and below 50% of a loss tangent of the first filling material.

An eleventh feature of the present invention according to the above feature is summarized as that an outside end of the second filling material in the tire radial direction is disposed more inside in the tire radial direction than an outside end of the carcass turn-up portion in the tire radial direction.

A twelfth feature of the present invention according to the above feature is summarized as that the carcass body and the carcass turn-up portion contact each other more outside in the tire radial direction than the outside end of the second filling material in the tire radial direction.

According to the present invention, it is possible to provide the pneumatic tire enables both reduced rolling resistance and driving stability at a high level.

DESCRIPTION OF EMBODIMENTS

First Embodiment

A pneumatic tire according to a first embodiment of the present invention will be explained with reference to the accompanying drawings. In particular, an explanation will be given of sections: (1) General configuration of a pneumatic tire, (2) Configuration of a part ranging from a bead portion to a sidewall portion, (3) Functions and effects, and (4) Other embodiments.

In the following drawings, the same or like reference signs are given to the same or like parts. It is to be noted that the drawings are schematic and the dimensions or ratios are different from real values. Therefore, actual dimensions should be determined according to the following explanations. The drawings include parts of different dimensions or ratios.

(1) General Configuration of a Pneumatic Tire

Figure 1:
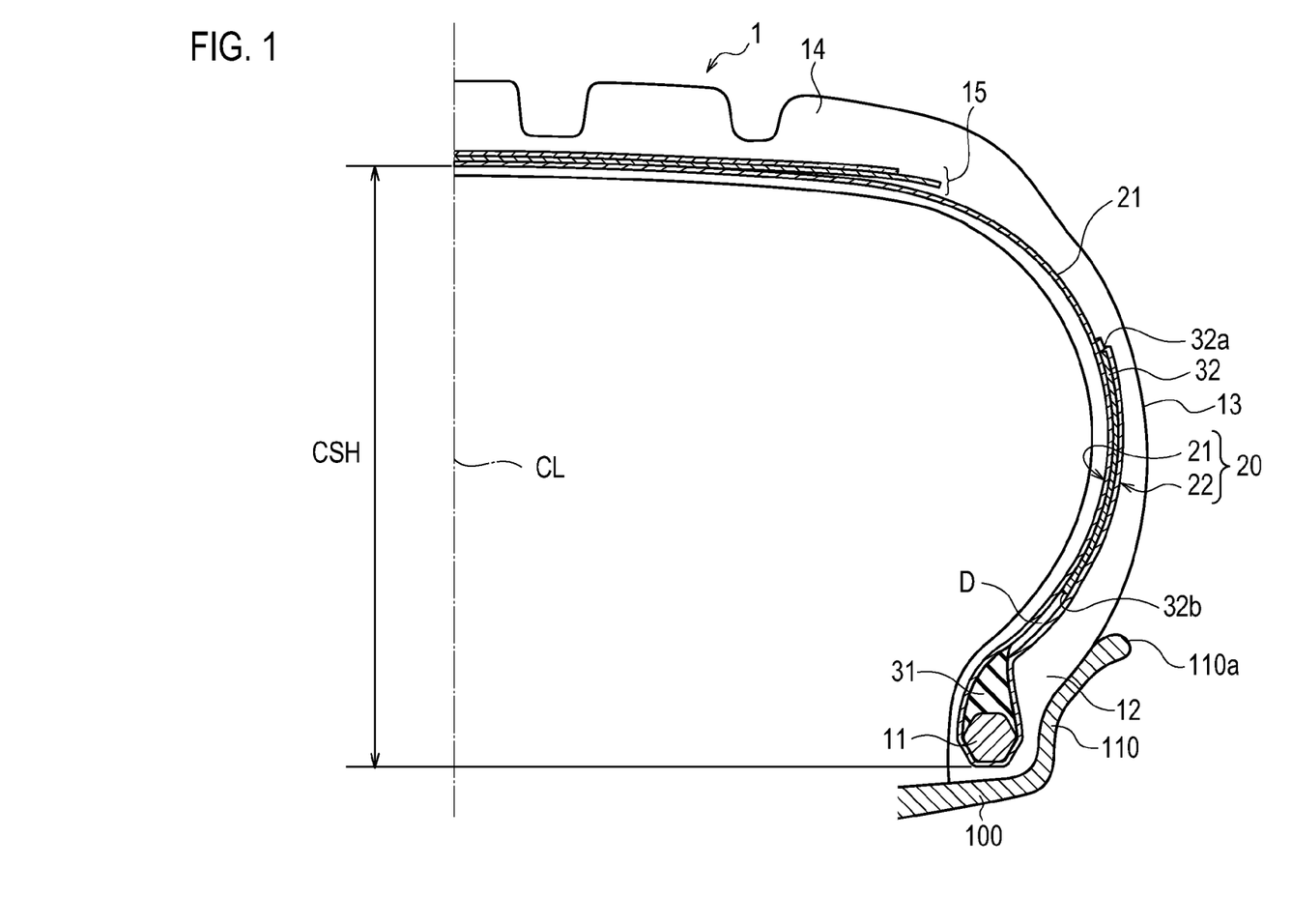
FIG. 1 is a sectional view in a tire radial direction and in a tire width direction of a pneumatic tire according to a first embodiment.

Hereinafter, a general configuration of a pneumatic tire will be explained with reference to the drawings. FIG. 1 is a diagram explaining a configuration of a pneumatic tire 1.

The pneumatic tire 1 comprises a pair of bead portions 12 having a bead core 11, a pair of sidewall portions 13, and a tread portion 14 contiguous to a pair of sidewall portions. FIG. 1 shows a bead core 11, a bead portion 12, and a sidewall portion 13 of only one side with respect to an equator line CL in the pneumatic tire 1. The pneumatic tire 1 is provided with a carcass 20 toroidally extending between a pair of bead cores 11. A plurality of belt layers 15 is provided between a tread portion 14 and a carcass 20. A pneumatic tire 1 is installed in a standard rim 100.

The standard rim 100 means a rim defined by standards. The standards are determined by industrial standards valid in districts where a tire is manufactured or used. For example, "YEAR BOOK OF THE TIRE AND RIM ASSOCIATION INC" in U.S.A, "STANDARDS MANUAL OF THE EUROPEAN TIRE AND RIM TECHNICAL ORGANIZATION" in Europe, and "JATMA YEAR BOOK OF JAPAN AUTOMOBILE AND TIRE ASSOCIATION" in Japan.

The carcass 20 has a carcass body 21 and a carcass turn-up portion 22. The carcass turn-up portion 22 is rewound around the bead core 11 from inside toward outside of the tire, and is extended outside in the radial direction of the tire.

Between the toroidally carcass body 21 and the carcass turn-up portion 22 turned up from the bead core 11, a bead filler 31 and a rubber sheet 32 are arranged. The bead filler 31 is located more outside than the bead core 11 in the tire radial direction. The rubber sheet 32 is located more outside than the bead filler 31 in the tire radial direction. In the embodiment, the bead filler 31 forms a first filling material, and the rubber sheet 32 forms a second filling material.

An end 32a of the rubber sheet 32 is located more inside in the tire radial direction than the end 22a of the carcass turn-up portion 22 in the tire radial direction.

Between an end 31a of the bead filler 31 outside in the tire radial direction and an end 32b of the rubber sheet 32 inside in the tire radial direction, a space D is provided.

In the embodiment, the carcass body 21 and carcass turn-up portion 22 contact each other more outside than the end 32a of the rubber sheet 32 in the tire radial direction.

Figure 2:
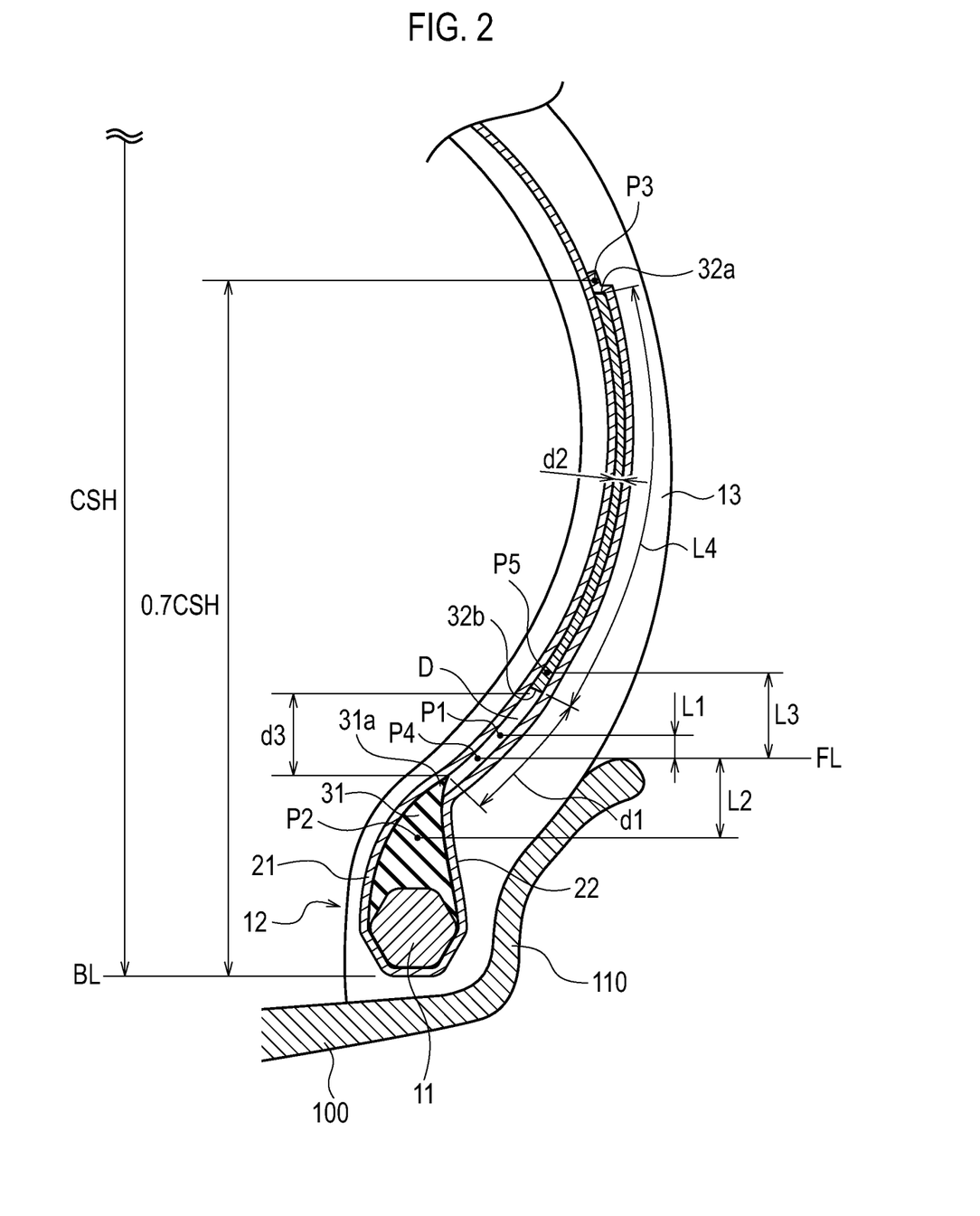
FIG. 2 is a magnified sectional view of a part ranging from a bead portion to a sidewall portion of the pneumatic tire according to the first embodiment.

(2) Configuration of a Part Ranging from a Bead Portion to a Side Wall Portion FIG. 2 is a magnified view explaining in detail a part ranging from a bead portion 12 to a side wall portion 13 of the pneumatic tire 1 according to the embodiment.

In the pneumatic tire 1, the length from the innermost position of the carcass body 21 in the tire radial direction to the outermost position of the carcass body 21 in the tire radial direction (called a carcass section height) is expressed as CSH. A flange line along the tire axial direction passing through an end 110a of a rim flange portion 110 of the standard rim 100 outside in the tire radial direction is defined as FL. A carcass baseline along the tire axial direction passing through an end of the carcass body 21 inside in the tire radial direction is defined as BL.

At this time, as shown in FIG. 2, the end 31a of the bead filler 31 outside in the tire radial direction is formed to be interposed between a point P1 at a length of 0.05 CSH more outside than the flange line FL in the tire radial direction, and a point P2 at a length of 0.10 CSH more inside than the flange line FL in the tire radial direction. In other words, L1=0.05 CSH and L2=0.10 CSH in FIG. 2.

The end 32a of the rubber sheet 32 outside in the tire radial direction is formed to be located at a point P3 at a length of 0.70 CSH more outside than the carcass baseline BL along the tire axis direction passing through the end of the carcass body 21 inside in the tire radial direction, or at a position more inside than the point P3 in the tire radial direction.

The end 32b of the rubber sheet 32 inside in the dire radial direction is formed to be located at a point P4 identical to the flange line FL, or between the point P4 and a point P5 at a length of 0.15 CSH more outside than the flange line FL in the tire radial direction. In other words, L3=0.15 CSH in FIG. 2.

The length L4 of the rubber sheet 32 along the carcass body 21 satisfies the relation $0.15\ CSH \leq L \leq 0.55\ CSH$.

The distance d1 between the end 31a of the bead filler 31 outside in the tire radial direction and the end 32b of the rubber sheet 32 inside in the tire radial direction (i.e., the length of the space D along the carcass body 21) is over 5 mm and below 15 mm.

The thickness d2 of the rubber sheet 32 in the normal direction of the carcass body 21 is over 0.5 mm and below 5.0 mm. More preferably, the thickness d2 is over 1.0 mm and below 2.0 mm.

The distance between the end 31a of the bead filler 31 outside in the tire radial direction and the end 32b of the rubber sheet 32 along the tire radial direction inside in the tire radial direction satisfies the relation $0.04\ CSH \leq d3 \leq 0.15\ CSH$.

An elastic modulus of the rubber sheet 32 is over 20% and below 50% of the elastic modulus of the bead filler 31. The elastic modulus mentioned here indicates the value measured by measuring the reaction force when a sine wave is applied to a rubber sample at a temperature of 50° C., a frequency of 15 Hz, and a distortion of 5%. Specifically, for example, the elastic modulus can be measured by using a viscoelasticity measuring apparatus manufactured by Rheometrics Inc.

A loss tangent (tan δ) of the rubber sheet 32 is over 10% and below 30% of the loss tangent of the bead filler 31.

(3) Functions and Effects

In a conventional pneumatic tire, when a sidewall portion deforms like falling outside in the tier width direction in an area where a pneumatic tire contacts a rim flange portion, the tire suffers a compressive deformation pressed to a rim flange portion in the vicinity of the origin of the deformation, and is compressed in the direction along a carcass body. In other words, in the vicinity of the origin of the deformation, a hysteresis loss that becomes a factor to decrease a rolling resistance occurs.

Further, as the stiffness of the bead filler is higher than the stiffness of rubber material forming a bead portion and a sidewall portion, an end of a bead filler outside in the tire width direction becomes a stiffness step, and deformation is likely to occur at this position.

As described above, when deformation that becomes a factor to cause a hysteresis loss occurs at several positions in a sidewall portion and a bead portion, the deformed rubber volume increases, and a hysteresis loss increases.

On the other hand, in the pneumatic tire 1 according to the embodiment, the bead filler 31 is located more outside than the bead core 11 in the tire radial direction, the rubber sheet 32 is located more outside than the bead filler 31 in the tire radial direction, and the space D is provided between the end 31*a* of the bead filler 31 outside in the tire radial direction and the end 32*b* of the rubber sheet 32 inside in the tire radial direction. The space D is filled with a rubber with a stiffness lower than that of the first and second filling materials, such as a rubber coating the carcass 20.

Therefore, the stiffness of the bead portion 12 of the pneumatic tire 1 is lower than the stiffness of a bead portion of a conventional pneumatic tire that the space D is filled with a filling material such as a rubber with a high stiffness. Thus, the pneumatic tire 1 is easy to locally deform in the space D of the bead portion 12.

In other words, in the pneumatic tire 1, the parts easy to deform are intentionally concentrated to decrease the volume of deformed rubber, thereby decreasing a hysteresis loss.

While decreasing the volume of deformed rubber, in the pneumatic tire 1, the rubber sheet 32 is located in being held by the carcass body 21 and carcass turn-up portion 22 with an appropriate interval taken from the space D contributing to deformation. By making such a sandwich structure as to hold a rubber between structures with high hardness (the carcass body 21 and the carcass turn-up portion 22), a part with a high stiffness is formed more outside than the space D in the pneumatic tire 1.

As described above, as the pneumatic tire 1 is so configured that the sidewall portion 13 is prevented from the influence of decreasing the stiffness in a local part of the bead portion 12, it is possible to prevent deterioration of the driving stability due to setting a stiffness low in the radial direction of the part ranging from the bead portion 12 to the sidewall portion 13.

By making a structure that the carcass body 21 and the carcass turn-up portion 22 contact each other more outside than the end 32*a* of the rubber sheet 32 in the tire radial direction, a stronger sandwich structure can be made, and the stiffness of the pneumatic tire 1 more outside than the space D in the tire radial direction can be enhanced.

In the pneumatic tire 1, the end 31*a* of the bead filler 31 is formed to be interposed between the point P1 and point P2, and the end 32*b* of the rubber sheet 32 is formed at the point P4, or between the point P4 and the point P5 more outside than the point P4 in the tire radial direction.

By configuring the pneumatic tire 1 as described above, the local deformation part corresponding to the space D formed in the bead portion 12 can be aligned with the area where the pneumatic tire 1 contacts the standard rim 100. In this configuration, the part ranging from the bead portion 12 to the sidewall portion 13 becomes easy to deform in the part contacting the standard rim 100 that function as a fulcrum.

The end 32*a* of the rubber sheet 32 is formed to be located at the point P3 or more inside than the point P3 in the tire radial direction. In the pneumatic tire 1, the length L of the rubber sheet 32 along the carcass body 21 satisfies the relation 0.15 CSH≤L≤0.4 CSH.

Thus, it is possible to increase the stiffness of the area contributing to the effect of increasing the lateral stiffness in the sidewall portion 13.

The interval d1 between the end 31*a* of the bead filler 31 and the end 32*b* of the rubber sheet 32 is preferably over 5 mm and below 10 mm. The distance d3 along the tire radial direction between the end 31*a* of the bead filler 31 outside in the tire radial direction and the end 32*b* of the rubber sheet 32 inside in the tire radial direction preferably satisfies the relation 0.04 CSH≤d3≤0.15 CSH.

By setting such an interval, the local deformation can be aligned with the portion where the part ranging from the bead portion 12 to the sidewall portion 13 contacts with the standard rim 100, and the effect to absorb some of the deformation of the whole pneumatic tire 1 can be increased.

The thickness d2 of the rubber sheet 32 in the normal direction of the carcass body 21 is over 0.5 mm and below 5.0 mm. Preferably, the thickness d2 is over 1.0 mm and below 2.0 mm. When the thickness of the sidewall portion 13 increases, the lateral stiffness can be increased, but a hysteresis loss is likely to occur. Thus, the thickness d2 of the rubber sheet 32 in the normal direction of the carcass body 21 forming the sidewall portion 13 is preferably set within the above range.

An elastic modulus of the rubber sheet 32 is over 20% and below 50% of the elastic modulus of the bead filler 31. A higher elastic modulus of the rubber sheet 32 is preferable. A loss tangent (tan δ) of the rubber sheet 32 is over 10% and below 30% of the loss tangent of the bead filler 31. A hysteresis loss increases when the tan δ is large, and decreases when the tan δ is small. Thus, a smaller tan δ is preferable to prevent an extra rolling resistance.

(4) Other Embodiments

Although the present invention has been described in terms of preferred embodiments, the foregoing discussion and drawings are not to be understood as restrictive of the invention. It will be appreciated that various alternative embodiments, examples might by those skilled in the art.

As described above, many embodiments not disclosed herein are to be understood as included in the present invention. The scope of the invention should, therefore, be defined by the appended claims.

Embodiment 1

We manufactured a conventional tire and a tire according to the embodiment, and compared the rolling resistance and driving stability. A tire was provided with one carcass ply, two belt layers crossing at an angle of 66° with respect to a tread width direction along the width of a tread, and a circumferential reinforcing layer made of nylon disposed outside in the tire radial direction of the belt layer. The tire size was 195/65R15. We manufactured the tires of comparative example 2 to 20 and embodiment 1 to 22 by changing the position of the end of a first filling material outside in the tire radial direction, the position of the end of a second filling material outside a tire radial direction, and the position of the end of a second filling material inside in the tire radial direction. A tire not having a second filling material was considered to be a comparative example tire.

(Rolling Resistance Test)

We installed the tires of comparative example and embodiment in a rated rim defined by JATMA (6 J in the embodiment), and obtained a rolling resistance by using a drum test machine having an iron plate surface with a diameter of 1.7 m. The measuring conditions were 80 km/h, 4.5 kN, 210 kPa at speed, load, internal pressure, respectively. Table 1 shows the results expressed by the indexes assuming the results of the tire of comparative example 1 to be 100.

(Driving Stability Test)

We measured a lateral spring constant at a load as an index of driving stability. Specifically, a load of 4.5 kN was applied, the axle was pulled in the tire lateral direction, and a lateral spring constant was measured. Table 1 shows the results expressed by the indexes assuming the results of the tire of comparative example 1 to be 100.

(Results)

TABLE 1

| | FIRST FILLING MATERIAL (BEAD FILLER) | SECOND FILLING MATERIAL (RUBBER SHEET) | POSITION OF AN END OF FIRST FILLING MATERIAL OUTSIDE A TIRE RADIAL DIRECTION (X1) | POSITION OF AN END OF SECOND FILLING MATERIAL OUTSIDE A TIRE RADIAL DIRECTION (X2) | POSITION OF AN END OF SECOND FILLING MATERIAL INSIDE A TIRE RADIAL DIRECTION (X3) | LENGTH OF SECOND FILLING MATERIAL (X4) | SPACE D (mm) | THICKNESS OF SECOND FILLING MATERIAL (mm) |
|---|---|---|---|---|---|---|---|---|
| COMPARATIVE EXAMPLE 1 | PROVIDED | NOT PROVIDED | 0.1 | — | — | — | — | — |
| COMPARATIVE EXAMPLE 2 | PROVIDED | PROVIDED | 0.1 | 0.4 | 0.15 | 0.1 | 5 | 1 |
| COMPARATIVE EXAMPLE 3 | PROVIDED | PROVIDED | −0.15 | 0.4 | 0 | 0.25 | 15 | 1 |
| COMPARATIVE EXAMPLE 4 | PROVIDED | PROVIDED | 0 | 0.8 | 0.1 | 0.55 | 10 | 1 |
| COMPARATIVE EXAMPLE 5 | PROVIDED | PROVIDED | 0.05 | 0.5 | 0.2 | 0.15 | 15 | 1 |
| COMPARATIVE EXAMPLE 6 | PROVIDED | PROVIDED | −0.1 | 0.5 | −0.05 | 0.4 | 5 | 1 |
| COMPARATIVE EXAMPLE 7 | PROVIDED | PROVIDED | −0.1 | 0.7 | −0.05 | 0.6 | 5 | 1 |
| COMPARATIVE EXAMPLE 8 | PROVIDED | PROVIDED | −0.1 | 0.25 | 0.05 | 0.05 | 15 | 1 |
| COMPARATIVE EXAMPLE 9 | PROVIDED | PROVIDED | 0 | 0.5 | 0.2 | 0.15 | 20 | 1 |
| COMPARATIVE EXAMPLE 10 | PROVIDED | PROVIDED | 0 | 0.5 | 0.02 | 0.33 | 2 | 1 |
| COMPARATIVE EXAMPLE 11 | PROVIDED | PROVIDED | 0 | 0.4 | 0.1 | 0.15 | 10 | 8 |
| COMPARATIVE EXAMPLE 12 | PROVIDED | PROVIDED | 0 | 0.4 | 0.1 | 0.15 | 10 | 0.1 |
| COMPARATIVE EXAMPLE 13 | PROVIDED | PROVIDED | 0 | 0.4 | 0.1 | 0.15 | 10 | 1 |
| COMPARATIVE EXAMPLE 14 | PROVIDED | PROVIDED | 0 | 0.4 | 0.1 | 0.15 | 10 | 1 |
| COMPARATIVE EXAMPLE 15 | PROVIDED | PROVIDED | 0 | 0.4 | 0.1 | 0.15 | 10 | 1 |
| COMPARATIVE EXAMPLE 16 | PROVIDED | PROVIDED | 0 | 0.4 | 0.1 | 0.15 | 10 | 1 |
| COMPARATIVE EXAMPLE 17 | PROVIDED | PROVIDED | 0 | 0.4 | 0.1 | 0.15 | 10 | 1 |
| COMPARATIVE EXAMPLE 18 | PROVIDED | PROVIDED | 0 | 0.4 | 0.1 | 0.15 | 10 | 1 |
| COMPARATIVE EXAMPLE 19 | PROVIDED | PROVIDED | 0 | 0.4 | 0.1 | 0.15 | 10 | 1 |
| COMPARATIVE EXAMPLE 20 | PROVIDED | PROVIDED | 0 | 0.4 | 0.1 | 0.15 | 10 | 1 |
| EMBODIMENT 1 | PROVIDED | PROVIDED | −0.1 | 0.4 | 0.05 | 0.2 | 15 | 1 |
| EMBODIMENT 2 | PROVIDED | PROVIDED | 0 | 0.45 | 0.05 | 0.25 | 5 | 1 |
| EMBODIMENT 3 | PROVIDED | PROVIDED | 0.05 | 0.7 | 0.15 | 0.4 | 10 | 1 |
| EMBODIMENT 4 | PROVIDED | PROVIDED | −0.05 | 0.7 | 0 | 0.55 | 5 | 1 |
| EMBODIMENT 5 | PROVIDED | PROVIDED | 0 | 0.5 | 0.1 | 0.25 | 10 | 1 |
| EMBODIMENT 6 | PROVIDED | PROVIDED | 0.05 | 0.55 | 0.15 | 0.25 | 10 | 1 |
| EMBODIMENT 7 | PROVIDED | PROVIDED | −0.05 | 0.35 | 0.05 | 0.15 | 10 | 1 |
| EMBODIMENT 8 | PROVIDED | PROVIDED | −0.03 | 0.3 | 0 | 0.15 | 3 | 1 |
| EMBODIMENT 9 | PROVIDED | PROVIDED | 0 | 0.4 | 0.1 | 0.15 | 10 | 1 |
| EMBODIMENT 10 | PROVIDED | PROVIDED | 0 | 0.4 | 0.1 | 0.15 | 10 | 0.5 |
| EMBODIMENT 11 | PROVIDED | PROVIDED | 0 | 0.4 | 0.1 | 0.15 | 10 | 2 |
| EMBODIMENT 12 | PROVIDED | PROVIDED | 0 | 0.4 | 0.1 | 0.15 | 10 | 5 |

TABLE 1-continued

| | | | | | | | | |
|---|---|---|---|---|---|---|---|---|
| EMBODIMENT 13 | PROVIDED | PROVIDED | 0 | 0.4 | 0.1 | 0.15 | 10 | 1 |
| EMBODIMENT 14 | PROVIDED | PROVIDED | 0 | 0.4 | 0.1 | 0.15 | 10 | 1 |
| EMBODIMENT 15 | PROVIDED | PROVIDED | 0 | 0.4 | 0.1 | 0.15 | 10 | 1 |
| EMBODIMENT 16 | PROVIDED | PROVIDED | 0 | 0.4 | 0.1 | 0.15 | 10 | 1 |
| EMBODIMENT 17 | PROVIDED | PROVIDED | 0 | 0.4 | 0.1 | 0.15 | 10 | 1 |
| EMBODIMENT 18 | PROVIDED | PROVIDED | 0 | 0.4 | 0.1 | 0.15 | 10 | 1 |
| EMBODIMENT 19 | PROVIDED | PROVIDED | 0 | 0.4 | 0.1 | 0.15 | 10 | 1 |
| EMBODIMENT 20 | PROVIDED | PROVIDED | 0 | 0.4 | 0.1 | 0.15 | 10 | 1 |
| EMBODIMENT 21 | PROVIDED | PROVIDED | 0 | 0.4 | 0.1 | 0.15 | 10 | 1 |
| EMBODIMENT 22 | PROVIDED | PROVIDED | 0 | 0.4 | 0.1 | 0.15 | 10 | 1 |

| | ELASTIC MODULUS OF SECOND FILLING MATERIAL WITH RESPECT TO ELASTIC MODULUS OF FIRST FILLING MATERIAL (%) | LOSS TANGENT OF SECOND FILLING MATERIAL WITH RESPECT TO LOSS TANGENT OF FIRST FILLING MATERIAL (%) | ELASTIC MODULUS OF SPACE WITH RESPECT TO ELASTIC MODULUS OF FIRST FILLING MATERIAL (%) | LOSS TANGENT OF SPACE WITH RESPECT TO LOSS TANGENT OF FIRST FILLING MATERIAL (%) | INDEX VALUE OF ROLLING RESISTANCE | INDEX VALUE OF DRIVING STABILITY |
|---|---|---|---|---|---|---|
| COMPARATIVE EXAMPLE 1 | — | — | — | — | 100 | 100 |
| COMPARATIVE EXAMPLE 2 | 30 | 10 | 10 | 25 | 103 | 101 |
| COMPARATIVE EXAMPLE 3 | 30 | 10 | 10 | 25 | 100 | 98 |
| COMPARATIVE EXAMPLE 4 | 30 | 10 | 10 | 25 | 104 | 102 |
| COMPARATIVE EXAMPLE 5 | 30 | 10 | 10 | 25 | 102 | 100 |
| COMPARATIVE EXAMPLE 6 | 30 | 10 | 10 | 25 | 100 | 99 |
| COMPARATIVE EXAMPLE 7 | 30 | 10 | 10 | 25 | 104 | 102 |
| COMPARATIVE EXAMPLE 8 | 30 | 10 | 10 | 25 | 100 | 99 |
| COMPARATIVE EXAMPLE 9 | 30 | 10 | 10 | 25 | 100 | 100 |
| COMPARATIVE EXAMPLE 10 | 30 | 10 | 10 | 25 | 100 | 100 |
| COMPARATIVE EXAMPLE 11 | 30 | 10 | 10 | 25 | 105 | 103 |
| COMPARATIVE EXAMPLE 12 | 30 | 10 | 10 | 25 | 100 | 100 |
| COMPARATIVE EXAMPLE 13 | 40 | 10 | 10 | 25 | 102 | 100 |
| COMPARATIVE EXAMPLE 14 | 5 | 10 | 10 | 25 | 101 | 99 |
| COMPARATIVE EXAMPLE 15 | 30 | 50 | 10 | 25 | 99 | 101 |
| COMPARATIVE EXAMPLE 16 | 30 | 5 | 10 | 25 | 93 | 98 |
| COMPARATIVE EXAMPLE 17 | 30 | 10 | 25 | 25 | 99 | 102 |
| COMPARATIVE EXAMPLE 18 | 30 | 10 | 1 | 25 | 100 | 97 |
| COMPARATIVE EXAMPLE 19 | 30 | 10 | 10 | 60 | 101 | 103 |
| COMPARATIVE EXAMPLE 20 | 30 | 10 | 10 | 5 | 99 | 98 |
| EMBODIMENT 1 | 30 | 15 | 10 | 25 | 93 | 102 |
| EMBODIMENT 2 | 30 | 15 | 10 | 25 | 95 | 105 |
| EMBODIMENT 3 | 30 | 15 | 10 | 25 | 98 | 107 |
| EMBODIMENT 4 | 30 | 15 | 10 | 25 | 98 | 107 |
| EMBODIMENT 5 | 30 | 15 | 10 | 25 | 95 | 103 |
| EMBODIMENT 6 | 30 | 15 | 10 | 25 | 96 | 105 |
| EMBODIMENT 7 | 30 | 15 | 10 | 25 | 92 | 101 |
| EMBODIMENT 8 | 30 | 15 | 10 | 25 | 93 | 102 |
| EMBODIMENT 9 | 30 | 15 | 10 | 25 | 93 | 104 |
| EMBODIMENT 10 | 30 | 15 | 10 | 25 | 92 | 102 |
| EMBODIMENT 11 | 30 | 15 | 10 | 25 | 96 | 105 |
| EMBODIMENT 12 | 30 | 15 | 10 | 25 | 98 | 106 |
| EMBODIMENT 13 | 20 | 15 | 10 | 25 | 94 | 105 |
| EMBODIMENT 14 | 40 | 15 | 10 | 25 | 95 | 106 |
| EMBODIMENT 15 | 50 | 15 | 10 | 25 | 96 | 107 |
| EMBODIMENT 16 | 30 | 10 | 10 | 25 | 91 | 103 |
| EMBODIMENT 17 | 30 | 20 | 10 | 25 | 92 | 103 |

TABLE 1-continued

| EMBODIMENT 18 | 30 | 30 | 10 | 25 | 93 | 103 |
| EMBODIMENT 19 | 30 | 10 | 20 | 25 | 92 | 103 |
| EMBODIMENT 20 | 30 | 10 | 3  | 25 | 91 | 103 |
| EMBODIMENT 21 | 30 | 10 | 10 | 50 | 92 | 104 |
| EMBODIMENT 22 | 30 | 10 | 10 | 10 | 91 | 102 |

In Table 1, the position of the end of the first filling material outside in the tire radial direction·X·1 is represented by "+" when it is more outside than the flange line FL shown in FIG. 2 in the tire radial direction, and is expressed by "−" when it is more inside than the flange line FL in the tire radial direction. The numeric value is a ratio to CSH (%). The position of the end of the second filling material outside in the tire radial direction·X·2 is the distance from the carcass baseline BL toward outside in the tire radial direction. The numeric value is a ratio to CSH (%). The position of the end of the second filling material inside in the tire radial direction·X·3 is the distance from the flange line FL toward outside in the tire radial direction. The numeric value is a ratio to CSH (%). The length of the second filling material·X·4 is expressed by a ratio to CSH (%).

According to the results shown in Table 1, the rolling resistance value is preferable when it is lower than 100. In consideration of an error and from the viewpoint of market supremacy, it is acceptable when a difference is 2% or more (i.e., an index value of 98 or less). When improvement of 5% or more is observed, it can be said especially great effect. The driving stability test shows a good reproducibility, and it can be acceptable when a difference is 1% or more (i.e., an index value of 101% or more).

Second Embodiment

A pneumatic tire according to a second embodiment of the present invention will be explained with reference to the accompanying drawings. In particular, an explanation will be given of sections: (1) General configuration of a pneumatic tire, (2) Configuration of a part ranging from a bead portion to a sidewall portion, (3) Functions and effects, and (4) Other embodiments.

In the following drawings, the same or like reference signs are given to the same or like parts. It is to be noted that the drawings are schematic and the dimensions or ratios are different from real values. Therefore, actual dimensions should be determined according to the following explanations. The drawings include parts of different dimensions or ratios.

(1) General Configuration of a Pneumatic Tire

Figure 3:
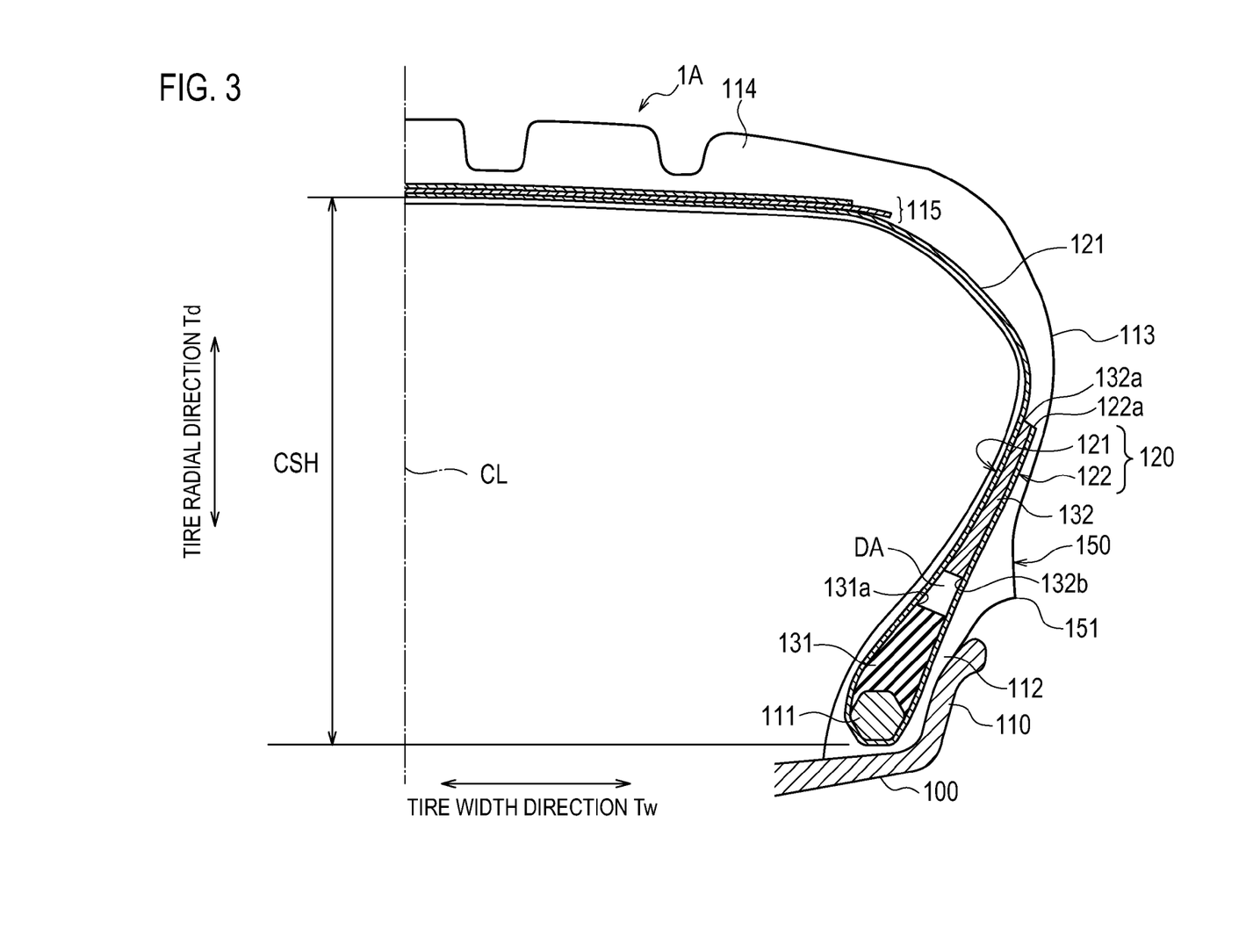
FIG. 3 is a sectional view in the tire radial direction and in the tire width direction of the pneumatic tire according to a second embodiment.

Hereinafter, a general configuration of a pneumatic tire will be explained with reference to the drawings. FIG. 3 is a sectional view in the tire width direction showing a configuration of a pneumatic tire 1A. The pneumatic tire 1A according to the embodiment has a rim guard, and assumes a tire with a small tire profile. A configuration of the pneumatic tire 1A will be described in detail.

The pneumatic tire 1A according to the present embodiment comprises a pair of bead portions 112 having a bead core 111, a pair of sidewall portions 113, and a tread portion 114 contiguous to the sidewall portion. FIG. 3 shows a bead core 111, a bead portion 112, and a sidewall portion 113 of only one side with respect to an equator line CL in the pneumatic tire 1A. The pneumatic tire 1A is provided with a carcass 120 toroidally extending between a pair of bead cores 111. A plurality of belt layers 115 is provided between a tread portion 114 a carcass 120. The pneumatic tire 1A is installed in a standard rim 100A.

The standard rim 100A means a rim defined by standards. The standards are determined by industrial standards valid in districts where a tire is manufactured or used. For example, "YEAR BOOK OF THE TIRE AND RIM ASSOCIATION INC" in U.S.A, "STANDARDS MANUAL OF THE EUROPEAN TIRE AND RIM TECHNICAL ORGANIZATION" in Europe, and "JATMA YEAR BOOK OF JAPAN AUTOMOBILE AND TIRE ASSOCIATION" in Japan.

The carcass 120 has a carcass body 121 and a carcass turn-up portion 122. The carcass turn-up portion 122 is rewound around the bead core 111 from inside toward outside of the tire, and is extended outside in the tire radial direction.

Between the toroidally carcass body 121 and the carcass turn-up portion 122 turned up at the bead core 111, a bead filler 131 and a rubber sheet 132 are disposed. The bead filler 131 is located more outside than the bead core 111 in the tire radial direction. The rubber sheet 132 is located more outside than the bead filler 131 in the tire radial direction. In the embodiment, the bead filler 131 forms a first filling material, and the rubber sheet 132 forms a second filling material.

An end 132a of the rubber sheet 132 outside in the tire radial direction is disposed at a position substantially the same level as the end 122a of the carcass turn-up portion 122 outside in the tire radial direction. The end 132a of the rubber sheet 132 outside in the tire radial direction may be disposed more inside than the end 122a of the carcass turn-up portion 122 in the tire radial direction, or may be disposed outside in the tire radial direction.

A space DA is provided between the end 131a of the bead filler 131 outside in the tire radial direction and the end 132b of the rubber sheet 132 inside in the tire radial direction.

The example of FIG. 3 shows a case where the carcass body 121 and carcass turn-up portion 122 do not contact each other more outside than the end 132a of the rubber sheet 132 in the tire radial direction. However, the carcass body 121 may contact the carcass turn-up portion 122.

In the embodiment, the sidewall portion 113 is provided with a rim guard 150 projecting toward outside in the tire width direction. The rim guard 150 is disposed more outside than the standard rim 100 in the tire radial direction. The rim guard 150 is formed so that a rim guard top 151 located most outside in the tire width direction is located more outside than the standard rim 100A in the tire width direction.

(2) Configuration of a Part Ranging from a Bead Portion to a Side Wall Portion

Figure 4:
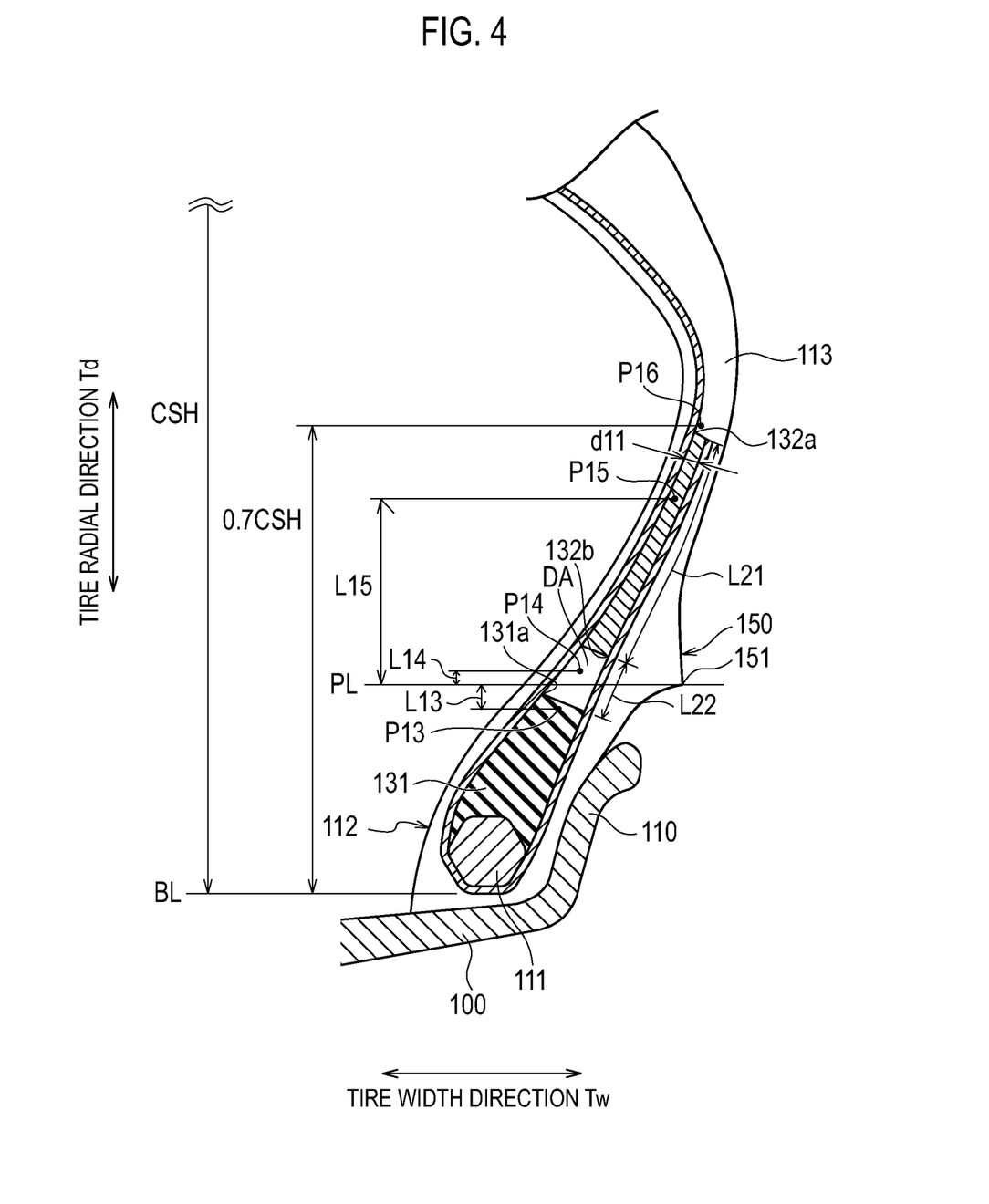
FIG. 4 is a magnified sectional view of a part ranging from a bead portion to a sidewall portion of the pneumatic tire according to the second embodiment.

FIG. 4 is a magnified view explaining in detail a part ranging from a bead portion 112 to a side wall portion 113 of the pneumatic tire 1A according to the embodiment.

In the pneumatic tire 1A, the length from the innermost position of the carcass body 121 in the tire radial direction to the outermost position of the carcass body 121 in the tire radial direction (called a carcass section height) is expressed as CSH. A carcass baseline along the tire axial direction passing through an end of the carcass body 121 inside in the tire radial direction is defined as BL. A top line along the tire axial direction passing through the rim guard top 151 of the rim guard 150 located most outside in the tire width direction is defined as PL.

The end 131a of the bead filler 131 outside in the tire radial direction is formed to be interposed between a point P13 at a length of 0.15 CSH more inside than the top line PL in the tire radial direction, and a point P14 at a length of 0.05 CSH more inside than the top line PL in the tire radial direction. In other words, L13=0.15 CSH and L14=0.05 CSH in FIG. 4.

The end 132b of the rubber sheet 132 inside in the dire radial direction is formed to be located at a point P14 at a length of 0.05 and a point P15 at a length of 0.2 more outside than the top line PL in the tire radial direction. In other words, L15=0.2 CSH in FIG. 4.

A space DA (predetermined space) is provided between the end 131a of the bead filler 131 outside in the tire radial direction and the end 132b of the rubber sheet 132 inside in the tire radial direction. When the end 132a of the rubber sheet 132 and the end 132b of the rubber sheet 132 are shaped in tapered form, both the end 132a and end 132b can be disposed on the line (the line including the point P14) at a length of 0.05 CSH more outside than the top line PL in the tire radial direction. In this case, the space DA is provided between the end 131a of the bead filler 131 and the end 132b of the rubber sheet 132.

The space DA provided as described above is filled with a rubber such as a coating rubber or the like that coating the carcass 120 with a stiffness lower than that of the bead filler 131 and rubber sheet 132. In other words, the stiffness of material disposed in the space DA is lower than that of the bead filler 131 and rubber sheet 132.

When expressed as an elastic modulus, the elastic modulus of the material disposed in the space DA provided between the bead filler 131 and the rubber sheet 132 is lower than the elastic modulus of the rubber sheet 132. The elastic modulus of the material disposed in the space DA provided between the bead filler 131 and the rubber sheet 132 is over 3% and below 20% of the elastic modulus of the bead filler 131.

An elastic modulus is a value measured by measuring a reaction force when a sine wave is applied to a rubber sample at a temperature of 50° C., a frequency of 15 Hz, and a distortion of 5%. Specifically, for example, an elastic modulus can be measured by using a viscoelasticity measuring apparatus manufactured by Rheometrics Inc.

A loss tangent (tan δ) of the material disposed in the space DA provided between the bead filler 131 and the rubber sheet 132 is over 10% and below 50% of the loss tangent (tan δ) of the bead filler 131.

The end 132a of the rubber sheet 132 outside in the tire radial direction is formed to be located at a point P16 at a length of 0.70 CSH more outside than the carcass baseline in the tire radial direction, or at a position more inside than the point P.16 in the tire radial direction.

The length L21 of the rubber sheet 132 along the carcass body 121 satisfies the relation 0.15 CSH≤L≤0.4 CSH.

The distance L22 between the end 131a of the bead filler 311 outside in the tire radial direction and the end 132b of the rubber sheet 132 inside in the tire radial direction (i.e., the length of the space DA along the carcass body 121) is over 3 mm and below 15 mm.

The thickness d11 of the rubber sheet 132 in the normal direction of the carcass body 121 is over 0.5 mm and below 5.0 mm. Preferably, the thickness d11 is over 1.0 mm and below 2.0 mm.

The elastic modulus of the rubber sheet 132 is over 10% and below 50% of the elastic modulus of the bead feeler 131.

A loss tangent (tan δ) of the rubber sheet 132 is over 10% and below 50% of the loss tangent of the bead filler 131.

(3) Functions and Effects

In a conventional pneumatic tire, when a sidewall portion deforms like falling outside in the tier width direction in an area where a pneumatic tire contacts a rim flange portion, the tire suffers a compressive deformation pressed to a rim flange portion in the vicinity of the origin of the deformation, and is compressed in the direction along a carcass body. In other words, in the vicinity of the origin of the deformation, a hysteresis loss that becomes a factor to decrease a rolling resistance occurs.

Further, as the bead filler stiffness is higher than the stiffness of rubber material forming a bead portion and a sidewall portion, an end of the bead filler outside in the tire width direction becomes a stiffness step, and deformation is likely to occur at this position.

In a pneumatic tire having a rim guard in a sidewall portion, an origin of deformation is likely to occur in the vicinity of a rim guard top. As the volume of a rim guard projecting outside in the tire width direction is large, a pneumatic tire having a rim guard is likely to cause a hysteresis loss that becomes a factor to decrease a rolling resistance.

As described above, when deformation causing a hysteresis loss occurs at several locations in a part ranging from a sidewall portion to a bead portion, the volume of the deformed rubber increases, and a hysteresis loss increases.

On the other hand, in the pneumatic tire 1A according to the embodiment, the bead filler 131 is located more outside than the bead core 111 in the tire radial direction, the rubber sheet 132 is located more outside than the bead filler 131 in the tire radial direction, and the space DA is provided between the end 131a of the bead filler 131 outside in the tire radial direction and the end 132b of the rubber sheet 132b inside in the tire radial direction. The space DA is filled with a rubber with stiffness lower than that of the bead filler 131 and rubber sheet 132, such as a rubber for coating the carcass 20.

The elastic modulus of the material disposed in the space DA is lower than the elastic modulus of the rubber sheet 132. The elastic modulus of the material disposed in the space DA is over 3% and below 20% of the elastic modulus of the bead filler 131.

Thus, in the pneumatic tire 1A according to the embodiment, the elastic modulus of the material disposed in the space DA is lower than the elastic modulus of a conventional pneumatic tire that the space DA is filled with a filling material with a high elastic modulus such as a rubber. Therefore, the pneumatic tire 1A is easy to locally deform in the space DA.

In other words, in the pneumatic tire 1A, the parts easy to deform are intentionally concentrated to decrease the volume of deformed rubber, thereby decreasing a hysteresis loss.

A loss tangent (tan δ) of the material disposed in the space DA is over 10% and below 50% of the loss tangent (tan δ) of the bead filler 131. A hysteresis loss increases when the tan δ is large, and decreases when the tan δ is small. Therefore, a rolling resistance can be prevented by setting the tan δ of the material disposed in the locally deforming space DA within the above range.

While decreasing the deformed rubber volume, in the pneumatic tire 1A, the rubber sheet 132 is located in being held by the carcass body 121 and carcass turn-up portion 122 with an appropriate interval taken from the space DA contributing to deformation. By making such a sandwich structure as to hold the rubber sheet 132 between structures with a high hardness (the carcass body 121 and the carcass turn-up portion 122), a part with a high stiffness is formed more outside than the space DA of the pneumatic tire 1A in the tire radial direction.

As described above, as the pneumatic tire 1A is so configured that the sidewall portion 113 is prevented from the influence of decreasing the stiffness of the space DA, it is possible to prevent deterioration of the driving stability due to setting a stiffness low in the radial direction of the part ranging from the bead portion 112 to the sidewall portion 113.

In the pneumatic tire 1A, the end 131a of the bead filler 131 is formed to be interposed between the point P13 and the point P14, and the end 132b of the rubber sheet 132 is formed to be interposed between the point P14 and the point P15.

By configuring the pneumatic tire 1A as described above, the local deformation area corresponding to the space DA can be aligned with the part in the vicinity of the top line PL along the tire axial direction passing through the rim guard top 151. In this configuration, the part ranging from the bead portion 112 to the sidewall portion 113 becomes easy to deform in the part in the vicinity of the top line PL of the rim guard top 151 that functions as a fulcrum. In other words, in the pneumatic tire 1A, consider the rim guard 150, the parts easy to deform are intentionally concentrated to decrease the volume of deformed rubber, thereby decreasing a hysteresis loss.

The end 132a of the rubber sheet 132 is formed to be located at the point P16 at a distance of 0.7 CSH from the carcass baseline, or more inside than the point P16 in the tire radial direction. In the pneumatic tire 1A, the length L of the rubber sheet 132 along the carcass body 121 satisfies the relation 0.15 CSH≤L21≤0.4 CSH. Thus, it is possible to increase the stiffness of the area contributing to the effect of increasing the lateral stiffness in the sidewall portion 113.

In the pneumatic tire 1A, the interval L22 between the end 131a of the bead filler 311 and the end 132b of the rubber sheet 132 (that is, the length of the space DA along the carcass body 121) is preferably over 3 mm and below 15 mm. By setting such an interval, the local deformation part can be aligned with the top line PL along the tire axial direction passing through the rim guard top 151, and the effect to absorb some of the deformation of the whole pneumatic tire 1A can be increased.

The thickness d11 of the rubber sheet 132 in the normal direction of the carcass body 121 is over 0.5 mm and below 5.0 mm. Preferably, the thickness d11 of the rubber sheet 132 is over 1.0 mm and below 2.0 mm. When the thickness of the sidewall portion 113 increases, the lateral stiffness can be increased, but a hysteresis loss is likely to occur. Thus, the thickness d11 of the rubber sheet 132 in the normal direction of the carcass body 121 forming the sidewall portion 113 is preferably set within the above range.

An elastic modulus of the rubber sheet 132 is over 10% and below 50% of the elastic modulus of the bead filler 131. An elastic modulus of the rubber sheet 132 is preferably as high as possible within the above range. A loss tangent (tan δ) of the rubber sheet 132 is over 10% and below 50% of the loss tangent of the bead filler 131. To prevent an extra rolling resistance, the tan δ of the rubber sheet 132 is preferably as small as possible within the above range.

(4) Other Embodiments

Although the present invention has been described in terms of preferred embodiments, the foregoing discussion and drawings are not to be understood as restrictive of the invention. It will be appreciated that various alternative embodiments, examples might by those skilled in the art. For example, the first embodiment and second embodiment can be combined.

As described above, many embodiments not disclosed herein are to be understood as included in the present invention. The scope of the invention should, therefore, be defined by the appended claims.

Embodiment 2

We manufactured a conventional pneumatic tire and a pneumatic tire according to the present embodiment, and compared the rolling resistance and driving stability. A pneumatic tire was provided with one carcass ply, two belt layers crossing at an angle of 66° with respect to a tread width direction along the width of a tread, and a circumferential reinforcing layer made of nylon disposed outside in the tire radial direction of the belt layer. A pneumatic tire having a rim guard in a sidewall portion was prepared. The tire size was 225/45R17. A rim guard top was outside in the tire radial direction at a distance of 0.245 CSH from a carcass baseline. One not including a second filling material (a rubber sheet 132) was considered to be a pneumatic tire of comparative example 1. We manufactured the tires of comparative example 2 to 20 and embodiment 1 to 20 by changing the position of an end of a first filling material (a bead filler 131) outside in the tire radial direction, the position of an end of a second filling material outside in the tire radial direction, the position of an end of a second filling material (a rubber sheet 132) inside in the tire radial direction, the elastic modulus of first filling material and second filling material, and the loss tangents of first filling material and second filling material. Table 2 shows the concrete specifications of the comparative examples and embodiments.

(Rolling Resistance Test)

We installed the tires of comparative example and embodiment in a rated rim defined by JATMA (7.5 J in the embodiment), and obtained a rolling resistance by using a drum test machine having an iron plate surface with a diameter of 1.7 m. The measuring conditions were at speed of 80 km/h, load of 4.41 kN, internal pressure of 230 kPa, respectively. Table 2 shows the results expressed by the indexes assuming the results of the tire of comparative example 1 to be 100.

(Driving Stability Test)

We measured a lateral spring constant at a load as an index of driving stability. Specifically, a load of 4.41 kN was applied, the axle was pulled in the tire lateral direction, and a lateral spring constant was measured. Table 2 shows the results expressed by the indexes assuming the results of the tire of comparative example 1 to be 100.

(Results)

TABLE 2

| | FIRST FILLING MATERIAL (BEAD FILLER) | SECOND FILLING MATERIAL (RUBBER SHEET) | POSITION OF AN END OF FIRST FILLING MATERIAL OUTSIDE A TIRE RADIAL DIRECTION (X1) | POSITION OF AN END OF SECOND FILLING MATERIAL OUTSIDE A TIRE RADIAL DIRECTION (X2) | POSITION OF AN END OF SECOND FILLING MATERIAL INSIDE A TIRE RADIAL DIRECTION (X3) | LENGTH OF SECOND FILLING MATERIAL (X4) | SPACE DA (L22) (mm) | THICKNESS OF SECOND FILLING MATERIAL (mm) |
|---|---|---|---|---|---|---|---|---|
| COMPARATIVE EXAMPLE 1 | PROVIDED | NOT PROVIDED | 0.1 | 0 | — | — | — | — |
| COMPARATIVE EXAMPLE 2 | PROVIDED | PROVIDED | 0.1 | 0.55 | 0.15 | 0.15 | 3.75 | 1 |
| COMPARATIVE EXAMPLE 3 | PROVIDED | PROVIDED | −0.2 | 0.55 | 0 | 0.3 | 15 | 1 |
| COMPARATIVE EXAMPLE 4 | PROVIDED | PROVIDED | 0.15 | 0.8 | 0.35 | 0.2 | 15 | 1 |
| COMPARATIVE EXAMPLE 5 | PROVIDED | PROVIDED | 0.05 | 0.7 | 0.4 | 0.05 | 26.25 | 1 |
| COMPARATIVE EXAMPLE 6 | PROVIDED | PROVIDED | −0.05 | 0.55 | 0 | 0.3 | 3.75 | 1 |
| COMPARATIVE EXAMPLE 7 | PROVIDED | PROVIDED | 0 | 0.9 | 0.05 | 0.6 | 3.75 | 1 |
| COMPARATIVE EXAMPLE 8 | PROVIDED | PROVIDED | 0 | 0.33 | 0.05 | 0.03 | 3.75 | 1 |
| COMPARATIVE EXAMPLE 9 | PROVIDED | PROVIDED | −0.15 | 0.55 | 0.2 | 0.1 | 26.25 | 1 |
| COMPARATIVE EXAMPLE 10 | PROVIDED | PROVIDED | 0.05 | 0.55 | 0.05 | 0.25 | 0 | 1 |
| COMPARATIVE EXAMPLE 11 | PROVIDED | PROVIDED | 0 | 0.55 | 0.05 | 0.25 | 3.75 | 8 |
| COMPARATIVE EXAMPLE 12 | PROVIDED | PROVIDED | 0 | 0.55 | 0.05 | 0.25 | 3.75 | 0.1 |
| COMPARATIVE EXAMPLE 13 | PROVIDED | PROVIDED | 0 | 0.55 | 0.05 | 0.25 | 3.75 | 1 |
| COMPARATIVE EXAMPLE 14 | PROVIDED | PROVIDED | 0 | 0.55 | 0.05 | 0.25 | 3.75 | 1 |
| COMPARATIVE EXAMPLE 15 | PROVIDED | PROVIDED | 0 | 0.55 | 0.05 | 0.25 | 3.75 | 1 |
| COMPARATIVE EXAMPLE 16 | PROVIDED | PROVIDED | 0 | 0.55 | 0.05 | 0.25 | 3.75 | 1 |
| COMPARATIVE EXAMPLE 17 | PROVIDED | PROVIDED | 0 | 0.55 | 0.05 | 0.25 | 3.75 | 1 |
| COMPARATIVE EXAMPLE 18 | PROVIDED | PROVIDED | 0 | 0.55 | 0.05 | 0.25 | 3.75 | 1 |
| COMPARATIVE EXAMPLE 19 | PROVIDED | PROVIDED | 0 | 0.55 | 0.05 | 0.25 | 3.75 | 1 |
| COMPARATIVE EXAMPLE 20 | PROVIDED | PROVIDED | 0 | 0.55 | 0.05 | 0.25 | 3.75 | 1 |
| EMBODIMENT 1 | PROVIDED | PROVIDED | −0.15 | 0.45 | 0.05 | 0.15 | 15 | 1 |
| EMBODIMENT 2 | PROVIDED | PROVIDED | 0 | 0.6 | 0.15 | 0.2 | 11.25 | 1 |
| EMBODIMENT 3 | PROVIDED | PROVIDED | 0.05 | 0.7 | 0.15 | 0.3 | 7.5 | 1 |
| EMBODIMENT 4 | PROVIDED | PROVIDED | 0 | 0.7 | 0.05 | 0.4 | 3.75 | 1 |
| EMBODIMENT 5 | PROVIDED | PROVIDED | 0.05 | 0.6 | 0.2 | 0.15 | 11.25 | 1 |
| EMBODIMENT 6 | PROVIDED | PROVIDED | 0 | 0.55 | 0.15 | 0.15 | 11.25 | 1 |
| EMBODIMENT 7 | PROVIDED | PROVIDED | 0.01 | 0.45 | 0.05 | 0.15 | 3 | 1 |
| EMBODIMENT 8 | PROVIDED | PROVIDED | 0 | 0.55 | 0.05 | 0.25 | 3.75 | 0.5 |
| EMBODIMENT 9 | PROVIDED | PROVIDED | 0 | 0.55 | 0.05 | 0.25 | 3.75 | 1 |
| EMBODIMENT 10 | PROVIDED | PROVIDED | 0 | 0.55 | 0.05 | 0.25 | 3.75 | 5 |
| EMBODIMENT 11 | PROVIDED | PROVIDED | 0 | 0.55 | 0.05 | 0.25 | 3.75 | 1 |
| EMBODIMENT 12 | PROVIDED | PROVIDED | 0 | 0.55 | 0.05 | 0.25 | 3.75 | 1 |
| EMBODIMENT 13 | PROVIDED | PROVIDED | 0 | 0.55 | 0.05 | 0.25 | 3.75 | 1 |
| EMBODIMENT 14 | PROVIDED | PROVIDED | 0 | 0.55 | 0.05 | 0.25 | 3.75 | 1 |
| EMBODIMENT 15 | PROVIDED | PROVIDED | 0 | 0.55 | 0.05 | 0.25 | 3.75 | 1 |
| EMBODIMENT 16 | PROVIDED | PROVIDED | 0 | 0.55 | 0.05 | 0.25 | 3.75 | 1 |
| EMBODIMENT 17 | PROVIDED | PROVIDED | 0 | 0.55 | 0.05 | 0.25 | 3.75 | 1 |
| EMBODIMENT 18 | PROVIDED | PROVIDED | 0 | 0.55 | 0.05 | 0.25 | 3.75 | 1 |
| EMBODIMENT 19 | PROVIDED | PROVIDED | 0 | 0.55 | 0.05 | 0.25 | 3.75 | 1 |
| EMBODIMENT 20 | PROVIDED | PROVIDED | 0 | 0.55 | 0.05 | 0.25 | 3.75 | 1 |

TABLE 2-continued

| | ELASTIC MODULUS OF SECOND FILLING MATERIAL WITH RESPECT TO ELASTIC MODULUS OF FIRST FILLING MATERIAL (%) | LOSS TANGENT OF SECOND FILLING MATERIAL WITH RESPECT TO LOSS TANGENT OF FIRST FILLING MATERIAL (%) | ELASTIC MODULUS OF SPACE WITH RESPECT TO ELASTIC MODULUS OF FIRST FILLING MATERIAL (%) | LOSS TANGENT OF SPACE WITH RESPECT TO LOSS TANGENT OF FIRST FILLING MATERIAL (%) | INDEX VALUE OF ROLLING RESISTANCE | INDEX VALUE OF DRIVING STABILITY |
|---|---|---|---|---|---|---|
| COMPARATIVE EXAMPLE 1 | — | — | — | — | 100 | 100 |
| COMPARATIVE EXAMPLE 2 | 30 | 25 | 10 | 25 | 103 | 102 |
| COMPARATIVE EXAMPLE 3 | 30 | 25 | 10 | 25 | 102 | 98 |
| COMPARATIVE EXAMPLE 4 | 30 | 25 | 10 | 25 | 105 | 103 |
| COMPARATIVE EXAMPLE 5 | 30 | 25 | 10 | 25 | 102 | 100 |
| COMPARATIVE EXAMPLE 6 | 30 | 25 | 10 | 25 | 101 | 99 |
| COMPARATIVE EXAMPLE 7 | 30 | 25 | 10 | 25 | 106 | 105 |
| COMPARATIVE EXAMPLE 8 | 30 | 25 | 10 | 25 | 100 | 101 |
| COMPARATIVE EXAMPLE 9 | 30 | 25 | 10 | 25 | 104 | 99 |
| COMPARATIVE EXAMPLE 10 | 30 | 25 | 10 | 25 | 102 | 102 |
| COMPARATIVE EXAMPLE 11 | 30 | 25 | 10 | 25 | 105 | 104 |
| COMPARATIVE EXAMPLE 12 | 30 | 25 | 10 | 25 | 100 | 100 |
| COMPARATIVE EXAMPLE 13 | 60 | 25 | 10 | 25 | 102 | 101 |
| COMPARATIVE EXAMPLE 14 | 10 | 25 | 10 | 25 | 101 | 99 |
| COMPARATIVE EXAMPLE 15 | 30 | 35 | 10 | 25 | 99 | 101 |
| COMPARATIVE EXAMPLE 16 | 30 | 5 | 10 | 25 | 96 | 98 |
| COMPARATIVE EXAMPLE 17 | 30 | 25 | 25 | 25 | 101 | 102 |
| COMPARATIVE EXAMPLE 18 | 30 | 25 | 1 | 25 | 99 | 97 |
| COMPARATIVE EXAMPLE 19 | 30 | 25 | 10 | 60 | 97 | 108 |
| COMPARATIVE EXAMPLE 20 | 30 | 25 | 10 | 5 | 90 | 99 |
| EMBODIMENT 1 | 30 | 25 | 10 | 25 | 93 | 101 |
| EMBODIMENT 2 | 30 | 25 | 10 | 25 | 94 | 103 |
| EMBODIMENT 3 | 30 | 25 | 10 | 25 | 95 | 105 |
| EMBODIMENT 4 | 30 | 25 | 10 | 25 | 92 | 103 |
| EMBODIMENT 5 | 30 | 25 | 10 | 25 | 92 | 103 |
| EMBODIMENT 6 | 30 | 25 | 10 | 25 | 94 | 105 |
| EMBODIMENT 7 | 30 | 25 | 10 | 25 | 92 | 104 |
| EMBODIMENT 8 | 30 | 25 | 10 | 25 | 94 | 101 |
| EMBODIMENT 9 | 30 | 25 | 10 | 25 | 91 | 106 |
| EMBODIMENT 10 | 30 | 25 | 10 | 25 | 95 | 107 |
| EMBODIMENT 11 | 20 | 25 | 10 | 25 | 92 | 104 |
| EMBODIMENT 12 | 40 | 25 | 10 | 25 | 94 | 106 |
| EMBODIMENT 13 | 50 | 25 | 10 | 25 | 95 | 107 |
| EMBODIMENT 14 | 30 | 10 | 10 | 25 | 89 | 103 |
| EMBODIMENT 15 | 30 | 20 | 10 | 25 | 90 | 105 |
| EMBODIMENT 16 | 30 | 30 | 10 | 25 | 95 | 106 |
| EMBODIMENT 17 | 30 | 25 | 20 | 25 | 92 | 107 |
| EMBODIMENT 18 | 30 | 25 | 3 | 25 | 93 | 104 |
| EMBODIMENT 19 | 30 | 25 | 10 | 50 | 94 | 107 |
| EMBODIMENT 20 | 30 | 25 | 10 | 10 | 90 | 105 |

In Table 2, the position of the end of the first filling material outside in the tire radial direction X1 is represented by "+" when it is more outside than the top line PL shown in FIG. 4 in the tire radial direction, and is expressed by "−" when it is more inside than the flange line PL in the tire radial direction. The numeric value is a ratio to CSH (%). The position of the end of the second filling material outside in the tire radial direction X2 is the distance from the carcass baseline BL toward outside in the tire radial direction. The numeric value is a ratio to CSH (%). The position of the end of the second filling material inside in the tire radial direction X3 is the distance from the flange line PL toward outside in the tire radial direction. The numeric value is a ratio to CSH (%). The length of the second filling material X4 is expressed by a ratio to CSH (%).

According to the results shown in Table 2, the rolling resistance value is preferable when it is lower than 100. The driving resistance is preferable when it is higher than 100. In consideration of an error and from the viewpoint of market supremacy, the rolling resistance test is acceptable when a difference is 2% or more (i.e., an index value of 98 or less). When an improvement of 5% or more is observed, it can be said an especially large effect. The driving stability test shows a good reproducibility, and it can be acceptable when a difference is 1% or more (i.e., an index value of 101% or more). As shown in Table 2, it is proved that the embodiment 1 to 16 realizes both decreased rolling resistance and improved driving stability, compared with the comparative example 1 to 8.

All the contents of Japanese Patent Application No. 2010-234658 (filed Oct. 19, 2010), and Japanese Patent Application No. 2011-143088 (filed Jun. 28, 2011) are incorporated in a present specification by reference.

INDUSTRIAL APPLICABILITY

As described hereinbefore, the pneumatic tire according to the present invention realizes both decreased rolling resistance and improved driving stability at a high level, and is useful in the field of tire manufacturing.

The invention claimed is:

1. A pneumatic tire which is provided with a carcass comprising a carcass body toroidally extending between a pair of bead cores, and a carcass turn-up portion that the carcass body is wound around the bead core from inside toward outside of the tire and extended outside in a tire radial direction of the tire, and is installed in a rim, comprising:
   a first filling material disposed between the carcass body and the carcass turn-up portion and more outside than the bead core in the tire radial direction; and
   a second filling material disposed more outside than the first filling material in the tire radial direction,
   wherein a predetermined space is provided in the tire radial direction between an outside end of the first filling material in the tire radial direction and an inside end of the second filling material in the tire radial direction,
   wherein an elastic modulus of a material disposed in the predetermined space provided between the first filling material and the second filling material is lower than an elastic modulus of the second filling material, wherein:
   when a length from an innermost position of the carcass body in the tire radial direction to an outermost position of the carcass body in the tire radial direction is expressed as CSH,
   the outside end of the first filling material in the tire radial direction is formed to be interposed between a position at a length of 0.05 CSH more outside than a flange line in the tire radial direction and a position at a length of 0.10 CSH more inside than the flange line in the tire radial direction, the flange line being a line along the tire axial direction passing through an outside end of a rim flange portion of the rim in the tire radial direction,
   an outside end of the second filling material in the tire radial direction is formed at a position at a length of 0.70 CSH more outside than a carcass baseline in the tire radial direction or at an inside of said position, the carcass baseline being a line along the tire axial direction passing through an inside end of the carcass body in the tire radial direction,
   the inside end of the second filling material in the tire radial direction is formed to be disposed at a position aligned with the flange line, or between a position at a length of 0.15 CSH more outside than the flange line in the tire radial direction and the flange line, and
   a length L of the second filling material along the carcass body satisfies the relation $0.15\ CSH \leq L \leq 0.55\ CSH$.

2. A pneumatic tire which is provided with a carcass comprising a carcass body toroidally extending between a pair of bead cores, and a carcass turn-up portion that the carcass body is wound around the bead core from inside toward outside of the tire and extended outside in a tire radial direction of the tire, and is installed in a rim, comprising:
   a first filling material disposed between the carcass body and the carcass turn-up portion and more outside than the bead core in the tire radial direction; and
   a second filling material disposed more outside than the first filling material in the tire radial direction,
   wherein a predetermined space is provided in the tire radial direction between an outside end of the first filling material in the tire radial direction and an inside end of the second filling material in the tire radial direction,
   wherein an elastic modulus of a material disposed in the predetermined space provided between the first filling material and the second filling material is lower than an elastic modulus of the second filling material, further comprising a rim guard projecting toward outside in the tire width direction, wherein:
   when an outermost point of the rim guard in the tire width direction is assumed to be a rim guard top, and
   a length from an innermost position of the carcass body in the tire radial direction to an outermost position of the carcass body in the tire radial direction is expressed as CSH,
   the outside end of the first filling material in the tire radial direction is formed to be interposed between a position at a length of 0.15 CSH more inside than a top line in the tire radial direction and a position at a length of 0.05 CSH more outside than the top line in the tire radial direction, the top line being a line along the tire axial line passing through the rim guard top,
   the inside end of the second filling material in the tire radial direction is formed to be interposed between a position at a length of 0.05 CSH more outside than the top line in the tire radial direction and a position at a length of 0.2 CSH more outside than the top line in the tire radial direction,
   an outside end of the second filling material in the tire radial direction is formed at a position at a length of 0.70 CSH more outside than a carcass baseline in the tire radial direction or at an inside of said position, the carcass baseline being a line along the tire axial direction passing through an inside end of the carcass body in the tire radial direction, and
   a length L of the second filling material along the carcass body satisfies the relation $0.15\ CSH \leq L \leq 0.4\ CSH$.

3. A pneumatic tire which is provided with a carcass comprising a carcass body toroidally extending between a pair of bead cores, and a carcass turn-up portion that the carcass body is wound around the bead core from inside toward outside of the tire and extended outside in a tire radial direction of the tire, and is installed in a rim, comprising:

a first filling material disposed between the carcass body and the carcass turn-up portion and more outside than the bead core in the tire radial direction; and a second filling material disposed more outside than the first filling material in the tire radial direction, wherein a predetermined space is provided in the tire radial direction between an outside end of the first filling material in the tire radial direction and an inside end of the second filling material in the tire radial direction, wherein an elastic modulus of a material disposed in the predetermined space provided between the first filling material and the second filling material is lower than an elastic modulus of the second filling material, wherein a loss tangent of the second filling material is over 10% and below 30% of a loss tangent of the first filling material.

4. A pneumatic tire which is provided with a carcass comprising a carcass body toroidally extending between a pair of bead cores, and a carcass turn-up portion that the carcass body is wound around the bead core from inside toward outside of the tire and extended outside in a tire radial direction of the tire, and is installed in a rim, comprising:

a first filling material disposed between the carcass body and the carcass turn-up portion and more outside than the bead core in the tire radial direction; and a second filling material disposed more outside than the first filling material in the tire radial direction, wherein a predetermined space is provided in the tire radial direction between an outside end of the first filling material in the tire radial direction and an inside end of the second filling material in the tire radial direction, wherein an elastic modulus of a material disposed in the predetermined space provided between the first filling material and the second filling material is lower than an elastic modulus of the second filling material, wherein an elastic modulus of a material disposed in the predetermined space provided between the first filling material and the second filling material is over 3% and below 20% of an elastic modulus of the first filling material.

5. A pneumatic tire which is provided with a carcass comprising a carcass body toroidally extending between a pair of bead cores, and a carcass turn-up portion that the carcass body is wound around the bead core from inside toward outside of the tire and extended outside in a tire radial direction of the tire, and is installed in a rim, comprising:

a first filling material disposed between the carcass body and the carcass turn-up portion and more outside than the bead core in the tire radial direction; and a second filling material disposed more outside than the first filling material in the tire radial direction, wherein a predetermined space is provided in the tire radial direction between an outside end of the first filling material in the tire radial direction and an inside end of the second filling material in the tire radial direction, wherein an elastic modulus of a material disposed in the predetermined space provided between the first filling material and the second filling material is lower than an elastic modulus of the second filling material, wherein a loss tangent of a material disposed in the predetermined space provided between the first filling material and the second filling material is over 10% and below 50% of a loss tangent of the first filling material.

6. A pneumatic tire which is provided with a carcass comprising a carcass body toroidally extending between a pair of bead cores, and a carcass turn-up portion that the carcass body is wound around the bead core from inside toward outside of the tire and extended outside in a tire radial direction of the tire, and is installed in a rim, comprising:

a first filling material disposed between the carcass body and the carcass turn-up portion and more outside than the bead core in the tire radial direction; and a second filling material disposed more outside than the first filling material in the tire radial direction, wherein a predetermined space is provided in the tire radial direction between an outside end of the first filling material in the tire radial direction and an inside end of the second filling material in the tire radial direction, wherein an elastic modulus of a material disposed in the predetermined space provided between the first filling material and the second filling material is lower than an elastic modulus of the second filling material, wherein an outside end of the second filling material in the tire radial direction is disposed more inside in the tire radial direction than an outside end of the carcass turn-up portion in the tire radial direction.

7. The pneumatic tire according to claim 6, wherein the carcass body and the carcass turn-up portion contact each other more outside in the tire radial direction than the outside end of the second filling material in the tire radial direction.

* * * * *